United States Patent
Liu

(10) Patent No.: US 9,890,074 B2
(45) Date of Patent: Feb. 13, 2018

(54) ELECTRONIC DEVICE, GLASS COVER AND METHOD OF MANUFACTURING GLASS COVER

(71) Applicant: HTC Corporation, Taoyuan County (TW)

(72) Inventor: Wen-Hao Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 100 days.

(21) Appl. No.: 13/773,605

(22) Filed: Feb. 21, 2013

(65) Prior Publication Data

US 2014/0233161 A1 Aug. 21, 2014

(51) Int. Cl.
*C03C 15/00* (2006.01)
*G06F 1/16* (2006.01)

(52) U.S. Cl.
CPC ............ *C03C 15/00* (2013.01); *G06F 1/1626* (2013.01); *G06F 1/1637* (2013.01); *G06F 1/1656* (2013.01); *B32B 2457/202* (2013.01); *C03C 2204/08* (2013.01); *C03C 2218/34* (2013.01); *C03C 2218/365* (2013.01); *Y10T 428/24355* (2015.01); *Y10T 428/24926* (2015.01); *Y10T 428/31* (2015.01)

(58) Field of Classification Search
None
See application file for complete search history.

(56) References Cited

U.S. PATENT DOCUMENTS 6,797,324 B2 9/2004 Pollara
7,276,181 B2 10/2007 Miwa
2005/0196552 A1* 9/2005 Lehmann ............... G02B 1/111
  428/1.1
2009/0298669 A1* 12/2009 Akiba et al. .................... 501/70
2009/0304976 A1 12/2009 Matsumoto et al.
2010/0273530 A1* 10/2010 Jarvis et al. .................. 455/566
2010/0285275 A1 11/2010 Baca et al.
(Continued)

FOREIGN PATENT DOCUMENTS

CN 102745904 10/2012
JP 2010206297 A * 9/2010
WO 2012153798 11/2012

OTHER PUBLICATIONS

"Office Action of Taiwan Counterpart Application", dated Aug. 20, 2014, p. 1-p. 6.
(Continued)

*Primary Examiner* — Anthony J Frost
(74) *Attorney, Agent, or Firm* — JCIPRNET

(57) ABSTRACT

A method for manufacturing a glass cover is provided, which includes following steps. A glass substrate is provided, wherein the glass substrate has a front surface and a back surface opposite to the front surface, and the front surface has a display region and a non-display region adjacent to the display region. The non-display region of the glass substrate is hazed. A glass cover and an electronic device are also provided. The glass cover is adapted to be disposed at an installation opening of a casing of the electronic device. The glass cover includes a glass substrate. The glass substrate has a front surface and a back surface opposite to the front surface, and the front surface has a display region and a non-display region adjacent to the display region, and the non-display region is hazed.

16 Claims, 12 Drawing Sheets

(56) References Cited

U.S. PATENT DOCUMENTS

2011/0255227 A1* 10/2011 Murakami ............... B32B 1/00
                                                    361/679.01
2011/0298739 A1   12/2011 Wu et al.
2012/0140604 A1*  6/2012 Kawakami et al. .......... 368/276
2012/0159774 A1*  6/2012 Foght .............................. 29/701

OTHER PUBLICATIONS

"Office Action of Taiwan Counterpart Application", dated May 22, 2015, p. 1-p. 6.

* cited by examiner

ELECTRONIC DEVICE, GLASS COVER AND METHOD OF MANUFACTURING GLASS COVER

BACKGROUND

Technical Field

The application is related to a glass cover and an electronic device. Particularly, the application is related to a method for manufacturing a glass cover and an electronic device using the glass cover.

Related Art

In recent years, along with quick development of technology industry, electronic products such as mobile phones, tablet computers and smart phones, etc. can be used by users to obtain required information at anytime in daily life, and the electronic products are developed to have features of convenience, multifunction and elegant in appearance. Meanwhile, the electronic products are also developed towards a trend of lightness, slimness, shortness and smallness, so as to improve operability and portability of the electronic products.

Some electronic products are simultaneously configured with a touch panel and a display panel, or configured with an integrated touch display panel to serve as an input and output interface to facilitate the user viewing a display region to read information and touching the display region to operate the electronic product. In such type of the electronic product, a touch function of a part of the electronic products covers the display region and keys in a non-display region. In other words, the electronic product is avoided to set mechanical keys in the non-display region to achieve an elegant appearance, and the user may operate the display region and the keys by touching a glass cover that covers the display region and the non-display region. However, such type of the glass cover is generally a bright surface, and when the user touches the glass cover to perform an operation, the user is hard to distinguish the display region and the keys through a sense of touch.

SUMMARY

The application is directed to a method for manufacturing a glass cover, by which a glass cover has a hazed appearance.

The application is directed to a glass cover, which has a hazed appearance and a better operation mode.

The application is directed to an electronic device, in which a glass cover has a hazed appearance and a better operation mode.

The application provides a method for manufacturing a glass cover, which includes following steps. A glass substrate is provided, wherein the glass substrate has a front surface and a back surface opposite to the front surface, and the front surface has a display region and a non-display region adjacent to the display region. The non-display region of the glass substrate is hazed.

The application further provides a glass cover, which is adapted to be disposed at an installation opening of a casing of an electronic device. The glass cover includes a glass substrate. The glass substrate has a front surface and a back surface opposite to the front surface, the front surface has a display region and a non-display region adjacent to the display region, and the non-display region is hazed.

The application further provides an electronic device including a casing, a glass cover and a display panel. The casing has an installation opening. The glass cover is disposed at the installation opening. The glass cover includes a glass substrate. The glass substrate has a front surface and a back surface opposite to the front surface, the front surface has a display region and a non-display region adjacent to the display region, and the non-display region is hazed. The display panel is disposed in the casing, where an optical image generated by the display panel is projected to external through the display region.

According to the above descriptions, in the method for manufacturing the glass cover of the application, by hazing the non-display region of the glass substrate of the glass cover, the glass cover has a hazed appearance. Moreover, since the non-display region of the glass substrate is hazed, the display region and the non-display region of the glass substrate have different sight and touching effects. Therefore, the glass cover and the electronic device applying the glass cover have the hazed appearance and have better operation mode.

In order to make the aforementioned and other features and advantages of the application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
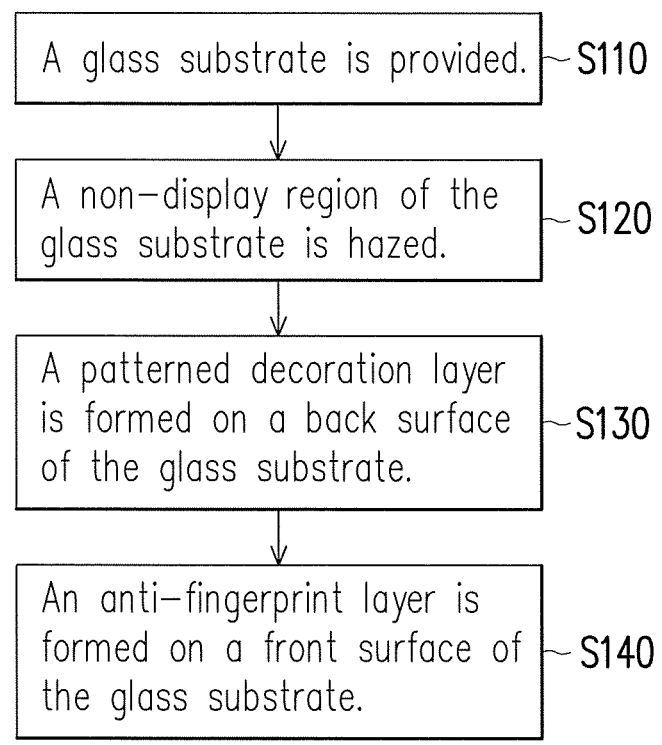
FIG. 1 is a flowchart illustrating a method for manufacturing a glass cover according to an embodiment of the application.

FIG. 1 is a flowchart illustrating a method for manufacturing a glass cover according to an embodiment of the application. Referring to FIG. 1, in the present embodiment, the steps of the method for manufacturing the glass cover 100 is as follows. In step S110, a glass substrate 110 is provided. In step S120, a non-display region 118 of the glass substrate 110 is hazed. In step S130, a patterned decoration layer 120 is formed on a back surface 114 of the glass substrate 110. In step S140, an anti-fingerprint layer 130 is formed on a front surface 112 of the glass substrate 110.

FIGS. 2A-2D are cross-sectional view of a process of manufacturing the glass cover of FIG. 1. FIGS. 3A-3D are front view of a process of manufacturing the glass cover of FIG. 1. In the present embodiment, the glass cover 100 is, for example, a glass cover applied in an electronic device, though the type of the glass cover is not limited by the application. The method for manufacturing the glass cover 100 of the present embodiment is described below with reference of FIGS. 2A-2D and FIGS. 3A-3D.

Figure 2A:
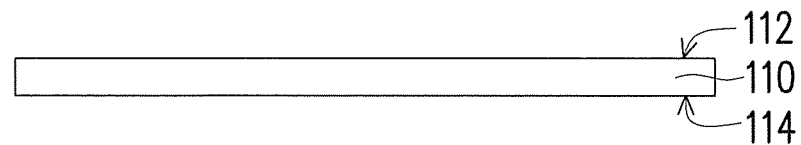
FIGS. 2A-2D are cross-sectional view of a process of manufacturing the glass cover of FIG. 1.
Figure 3A:
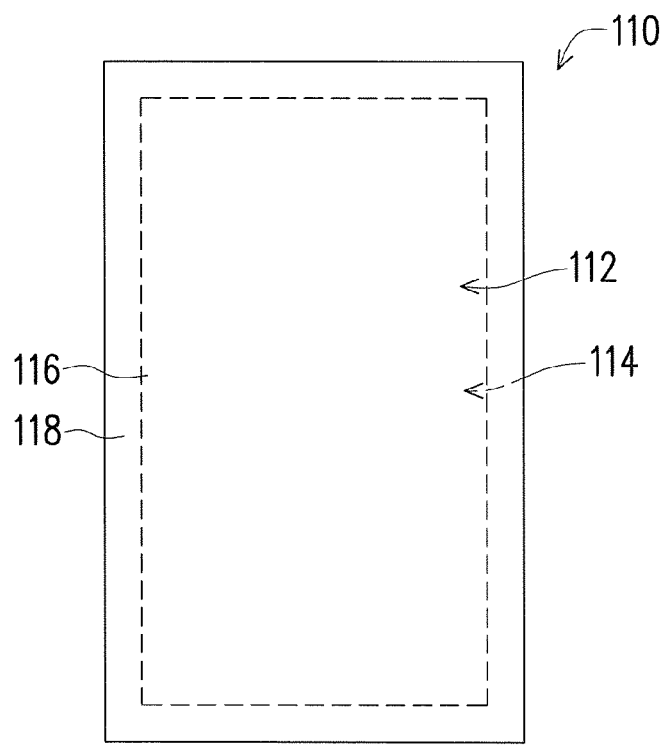
FIGS. 3A-3D are front view of a process of manufacturing the glass cover of FIG. 1.

Referring to FIG. 1, FIG. 2A and FIG. 3A, in the step S110, the glass substrate 110 is provided. In the present embodiment, the glass substrate 110 has the front surface 112 and the back surface 114 opposite to the front surface 112, where the front surface 112 has a display region 116 and the non-display region 118 adjacent to the display region 116. A pre-treatment process, for example, a cutting, lapping or polishing process can be performed on the glass substrate 110 to adjust a size, shape or surface smoothness of the glass substrate 110 according to a requirement.

Figure 2B:
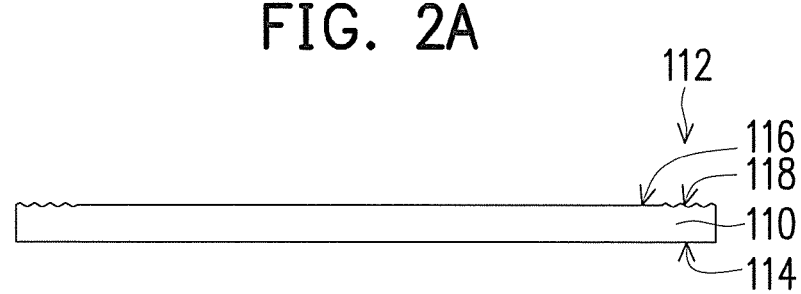
Figure 3B:
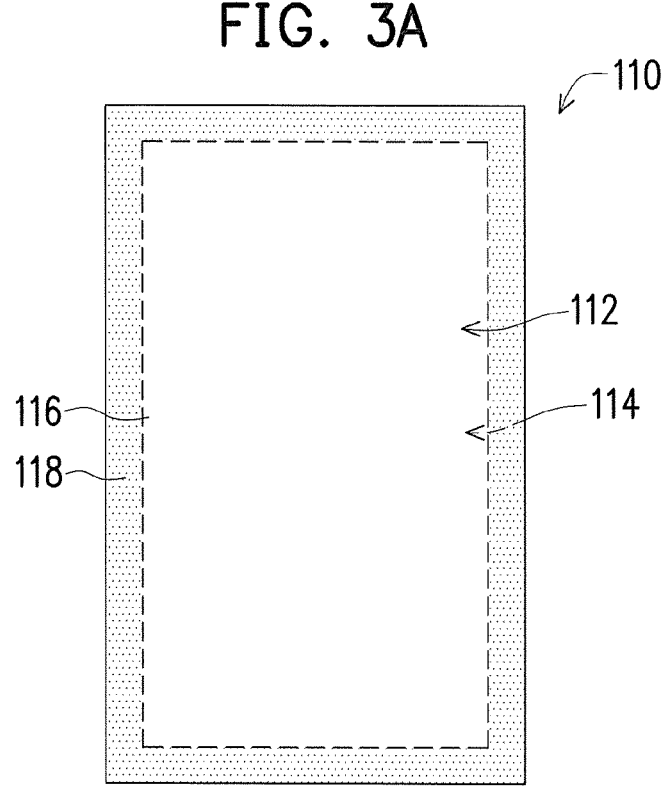

Referring to FIG. 1, FIG. 2B and FIG. 3B, in the step S120, the non-display region 118 of the glass substrate 110 is hazed. In the present embodiment, the step S120 is to etch the non-display region 118 of the glass substrate 110, and the step of etching the non-display region 118 of the glass substrate 110 is described later. However, in other embodiments, the step of hazing the non-display region of the glass substrate includes performing laser processing on the non-display region 118 of the glass substrate 110 or forming a hazed layer (for example, through printing) on the non-display region of the glass substrate, and the method for hazing the non-display region of the glass substrate is not limited by the application. Therefore, the non-display region 118 is hazed by an uneven surface thereof. Moreover, after the non-display region 118 of the glass substrate 110 is hazed, a polishing process and a chemical hardening process can be performed on the glass substrate 110 to trim edges of the glass substrate 110 and enhance the strength of the glass substrate 110, though the application is not limited thereto.

Figure 2C:
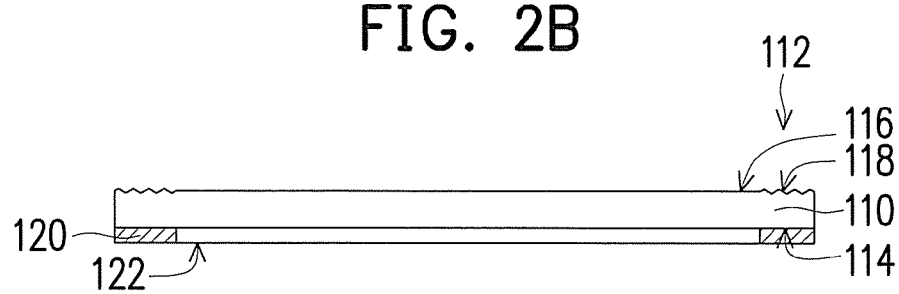
Figure 3C:
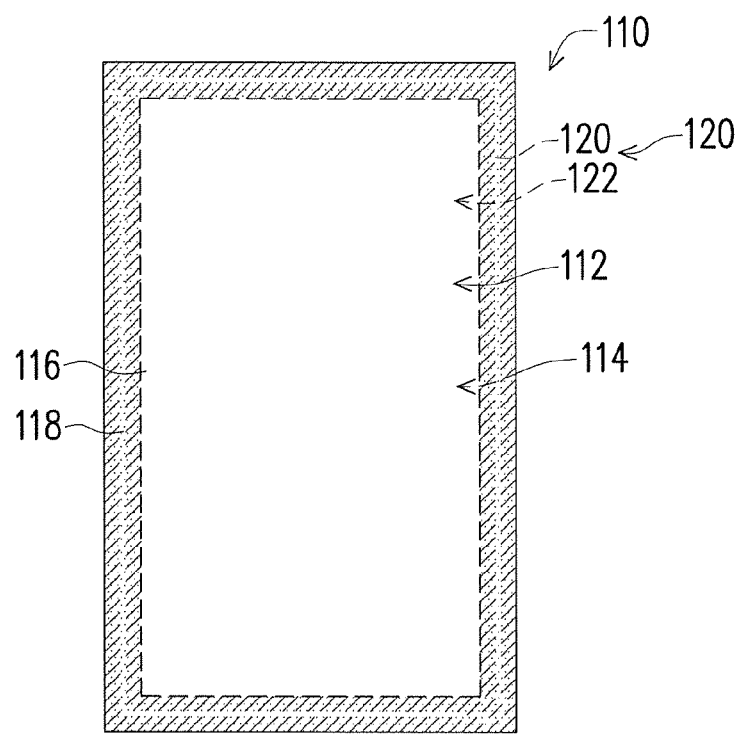

Referring to FIG. 1, FIG. 2C and FIG. 3C, in the step S130, the patterned decoration layer 120 is formed on the back surface 114 of the glass substrate 110. In the present embodiment, the step S130 is to print black ink on the back surface 114 of the glass substrate 110, though the method of forming the patterned decoration layer 120 and the type and color of the patterned decoration layer 120 are not limited by the application. The patterned decoration layer 120 has a light transmissible opening 122, and the light transmissible opening 122 corresponds to the display region 116. Therefore, after the patterned decoration layer 120 is formed on the back surface 114 of the glass substrate 110, the display region 116 of the glass substrate 110 maintains a light transmissible state, and the non-display region 118 is hazed and can display a color and pattern of the patterned decoration layer 120 on the back surface 114 of the glass substrate 110 through light transmissibility of the glass substrate 110.

Figure 2D:
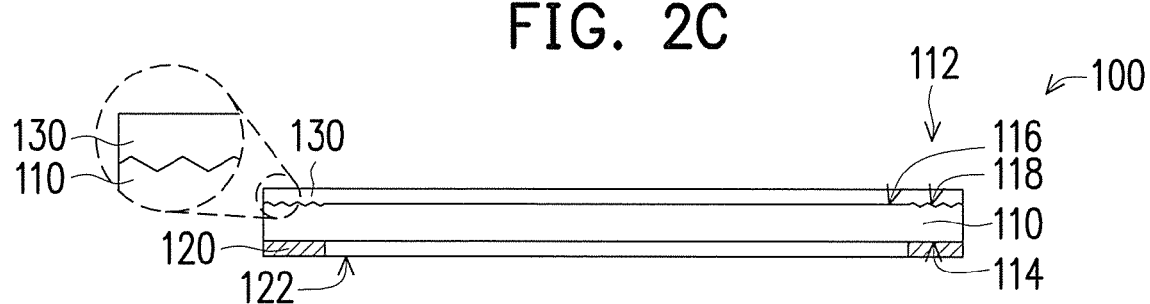
Figure 3D:
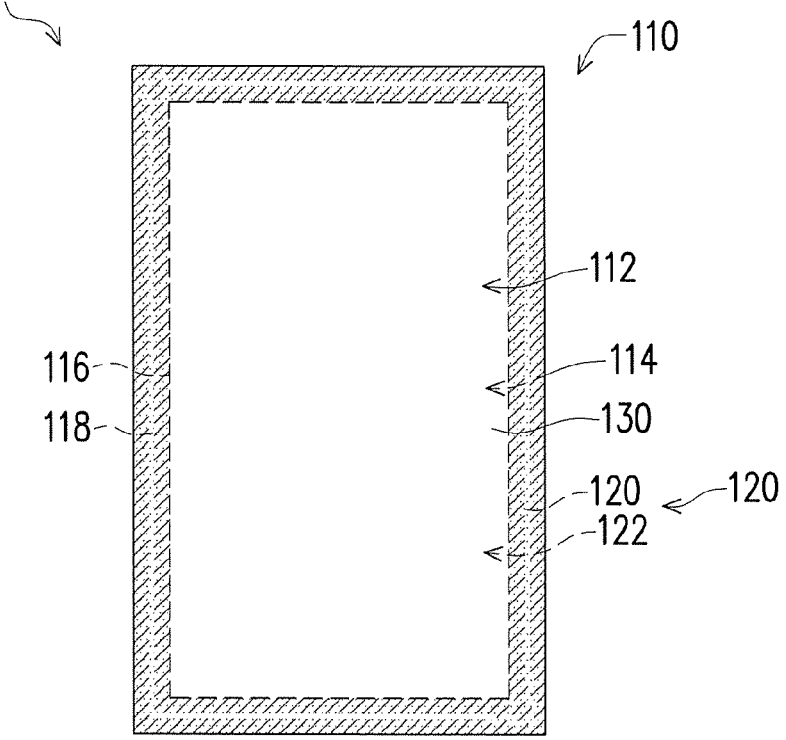

Referring to FIG. 1, FIG. 2D and FIG. 3D, in the step S140, the anti-fingerprint layer 130 is formed on the front surface 112 of the glass substrate 110. In the present embodiment, the step S140 is, for example, to coat an anti-fingerprint coating on the front surface 112 of the glass substrate 110, though the method of forming the anti-fingerprint layer 130 and the type of the anti-fingerprint layer 130 are not limited by the application. Therefore, when the user uses the glass cover 100, the anti-fingerprint layer 130 can prevent fingerprints of the user or dirt from remaining on the glass substrate 110.

Therefore, according to the method for manufacturing the glass cover 100 of the application, the non-display region 118 of the glass substrate 110 of the glass cover 100 is hazed to achieve a hazed appearance of the glass cover 100. Moreover, since the non-display region 118 of the glass substrate 110 is hazed, the display region 116 and the non-display region 118 of the glass substrate 110 may have different visual and touching effects.

Figure 4:
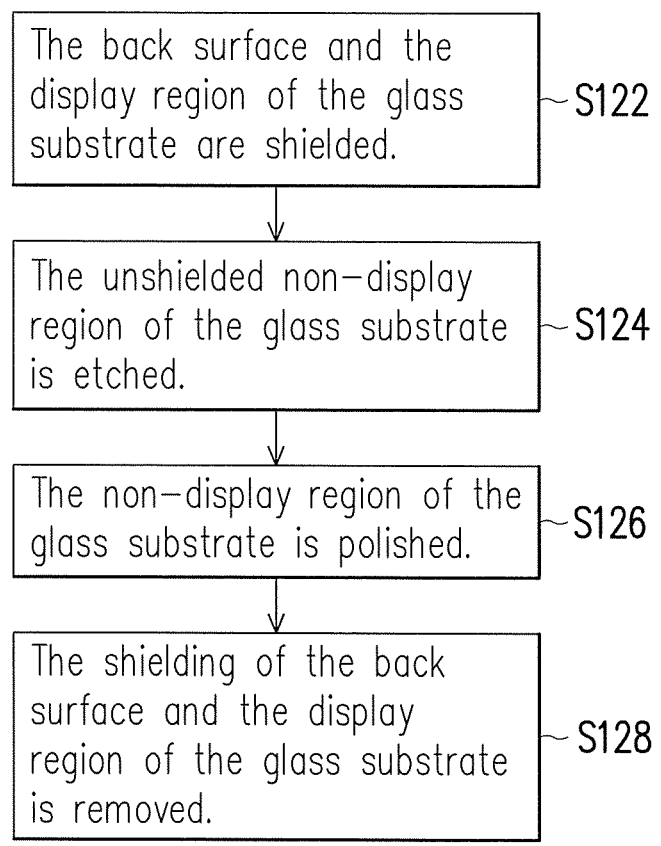
FIG. 4 is a flowchart illustrating a method for hazing the non-display region of the glass substrate of FIG. 1.

FIG. 4 is a flowchart illustrating a method for hazing the non-display region of the glass substrate of FIG. 1. Referring to FIG. 1 and FIG. 4, in the present embodiment, the step of hazing the non-display region 118 of the glass substrate 110 (the step S120) includes etching the non-display region 118 of the glass substrate 110, and the step of etching the non-display region 118 of the glass substrate 110 includes following steps. In step S122, the back surface 114 and the display region 116 of the glass substrate 110 are shielded. In step S124, the unshielded non-display region 118 of the glass substrate 110 is etched. In step S126, the non-display region 118 of the glass substrate 110 is polished. In step S128, the shielding of the back surface 114 and the display region 116 of the glass substrate 110 is removed.

FIGS. 5A-5D are schematic diagrams illustrating a process of hazing the non-display region of the glass substrate of FIG. 4. In order to clearly deliver the process of hazing the non-display region 118 of the glass substrate 110, FIGS. 5A-5D simultaneously illustrate the front surface 112 and the back surface 114 of the glass substrate 110. The process of hazing the non-display region 118 of the glass substrate 110 of the present embodiment is described in detail below with reference of FIG. 4 and FIGS. 5A-5D.

Figure 5A:
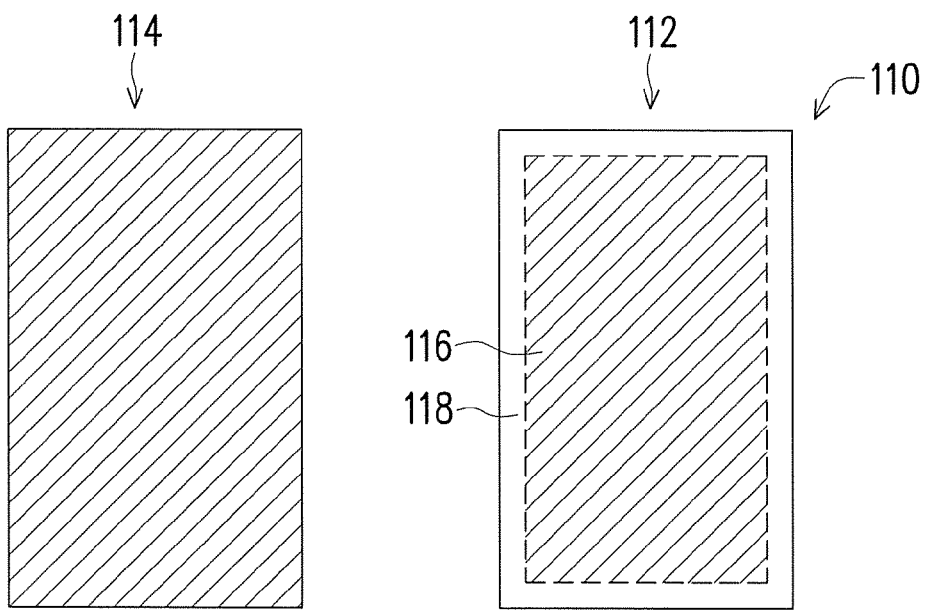
FIGS. 5A-5D are schematic diagrams illustrating a process of hazing the non-display region of the glass substrate of FIG. 4.

Referring to FIG. 4 and FIG. 5A, first, in the step S122, the back surface 114 and the display region 116 of the glass substrate 110 are shielded. In the present embodiment, after the step of providing the glass substrate 110 (the step S110), the back surface 114 and the display region 116 of the glass substrate 110 are shielded (the step S122), and the step S122 is, for example, to print ink on the back surface 114 and the display region 116, though the method of shielding the back surface 114 and the display region 116 of the glass substrate 110 is not limited by the application.

Figure 5B:
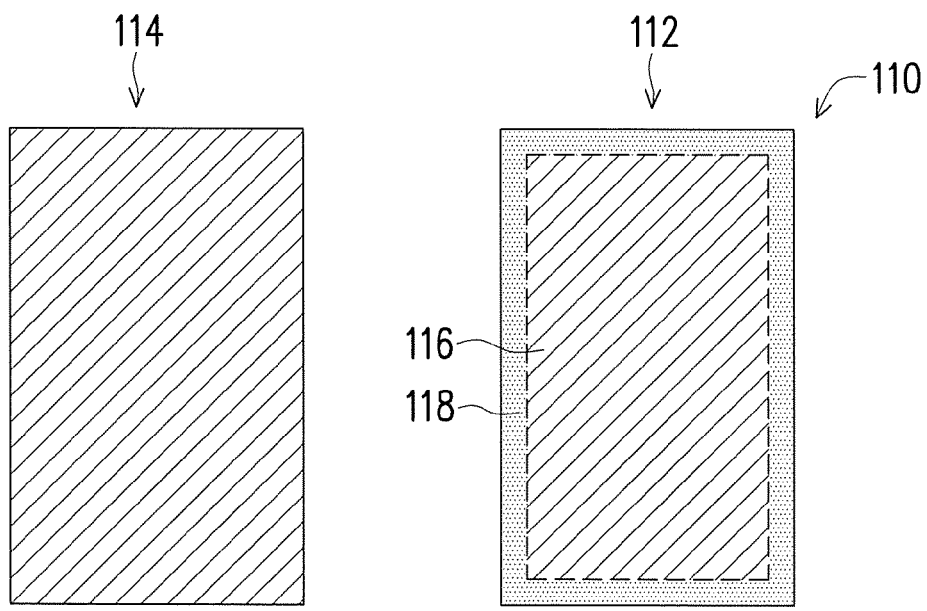

Referring to FIG. 4 and FIG. 5B, in the step S124, the unshielded non-display region 118 of the glass substrate 110 is etched. In the present embodiment, the step S124 is to immerse the glass substrate 110 in an etching fluid. In case that the back surface 114 and the display region 116 of the glass substrate 110 are shielded, by immersing the glass substrate 110 into the etching fluid, the etching fluid can etch the unshielded non-display region 118 without etching the shielded back surface 114 and the display region 116. Moreover, in other embodiments, the step S124 is to spray the etching fluid on the glass substrate 110 to etch the unshielded non-display region 118 without etching the shielded back surface 114 and the display region 116. The method of etching the glass substrate 110 is not limited by the application. After the step S124 is completed, the non-display region 118 of the glass substrate 110 is etched to be uneven for hazing.

Figure 5C:
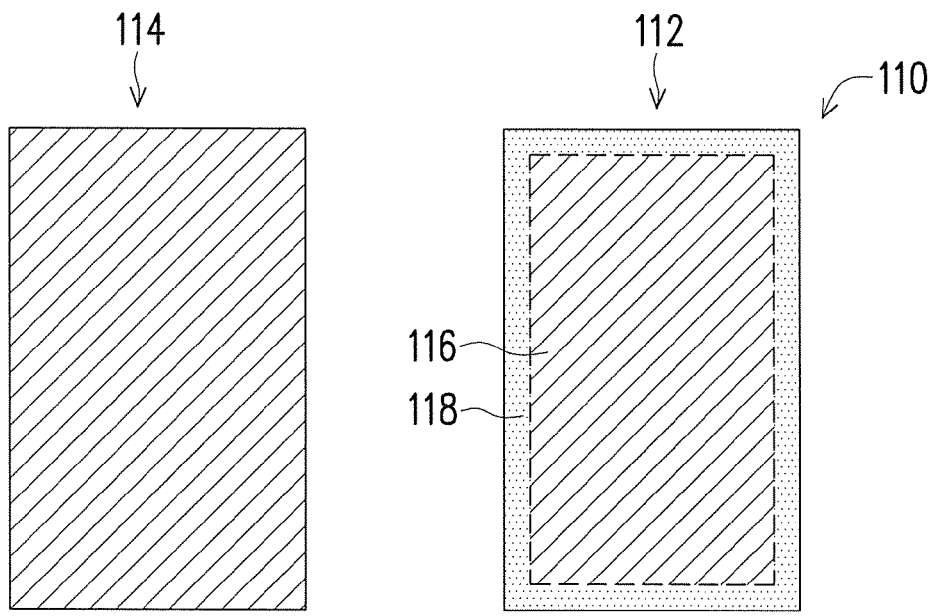

Referring to FIG. 4 and FIG. 5C, in the step S126, the non-display region 118 of the glass substrate 110 is polished. In the present embodiment, the step S126 is to flush the glass substrate 110 by polishing agent, though the method of polishing the glass substrate 110 is not limited by the application. In case that the back surface 114 and the display region 116 of the glass substrate 110 are shielded, by flushing the glass substrate 110 by the polishing agent, the polishing agent can polish the unshielded and hazed non-display region 118 without influencing the shielded back surface 114 and the shielded display region 116. In this way, a hazing degree of the non-display region 118 can be adjusted. However, after the non-display region 118 is hazed after etching, polishing of the non-display region 118 can be omitted, which is not limited by the application.

Figure 5D:
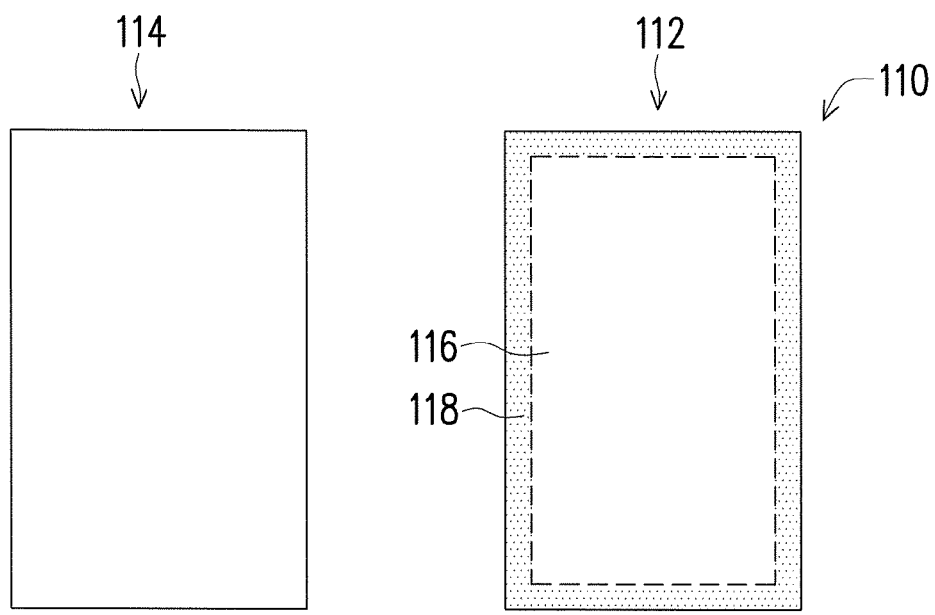

Referring to FIG. 4 and FIG. 5D, finally, in the step S128, the shielding of the back surface 114 and the display region 116 of the glass substrate 110 is removed. In the present embodiment, since the back surface 114 and the display region 116 of the glass substrate 110 are coated by ink for shielding, the step S128 is to remove the ink on the back surface 114 and the display region 116 of the glass substrate 110. After the shielding on the back surface 114 and the display region 116 of the glass substrate 110 is removed, the back surface 114 and the display region 116 are recovered to the light transmissible state, and the non-display region 118 is hazed.

Therefore, in the step S120 of the present embodiment, by etching the non-display region 118 of the glass substrate 110, the non-display region 118 can be hazed as that shown in FIG. 2B, FIG. 3B and FIG. 5D. After the step of hazing the non-display region 118 of the glass substrate 110, the edge of the glass substrate 110 can be trimmed through the aforementioned polishing process and the strength of the glass substrate 110 can be enhanced through the aforementioned chemical hardening process, and then the steps S130 and S140 are performed to complete the glass cover 100.

On the other hand, in the other embodiments, the step of hazing the non-display region 118 of the glass substrate 110 in the step S120 includes performing laser processing on the non-display region 118 of the glass substrate 110. In the present embodiment, since the laser technique can be selectively applied to a specific region (for example, the non-display region 118 of the present embodiment), the glass substrate 110 is unnecessary to be shielded in advance, and the laser processing can be directly performed on the non-display region 118 to haze the non-display region 118. After the step of performing laser processing on the non-display region 118 of the glass substrate 110, the edge of the glass substrate 110 can be trimmed through the aforementioned polishing process and the strength of the glass substrate 110 can be enhanced through the aforementioned chemical hardening process, and then the steps S130 and S140 are performed to complete the glass cover 100.

Figure 6:
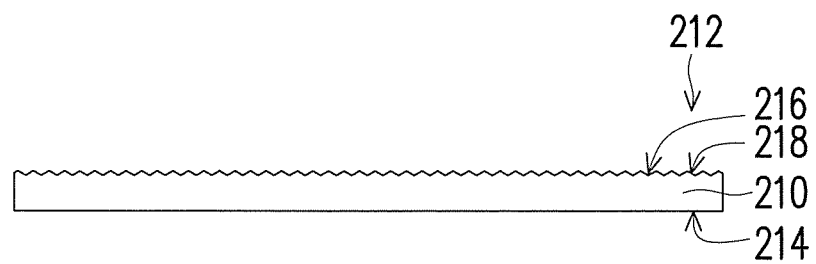
FIG. 6 is a cross-sectional view of a glass cover according to another embodiment of the application.
Figure 7:
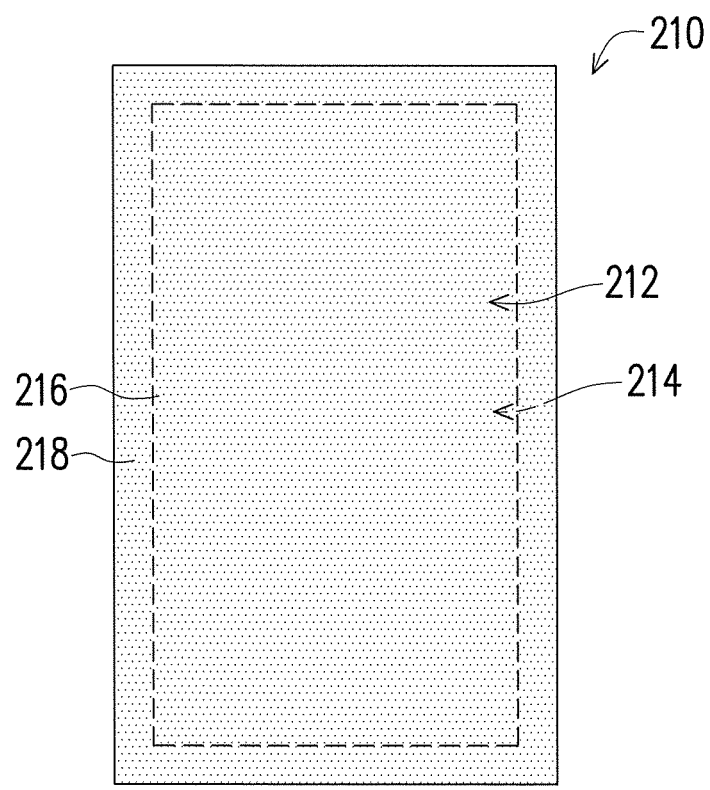
FIG. 7 is a front view of the glass cover of FIG. 6.

FIG. 6 is a cross-sectional view of a glass cover according to another embodiment of the application. FIG. 7 is a front view of the glass cover of FIG. 6. Referring to FIG. 6 and FIG. 7, in the other embodiment of the application, the step of hazing the non-display region 118 of the glass substrate 110 in step S120 further includes hazing the front surface 212 of the glass substrate 210, wherein the step of etching the non-display region 118 of the glass substrate 110 further includes etching the front surface 212 of the glass substrate 210, and the step of etching the front surface 212 of the glass substrate 210 is similar to the aforementioned step of etching the non-display region 118 of the glass substrate 110.

In detail, the step of etching the front surface 212 of the glass substrate 210 includes shielding the back surface 214 of the glass substrate 210 and etching the unshielded front surface 212 of the glass substrate 210, wherein the step of shielding the back surface 214 of the glass substrate 210 includes printing ink on the back surface 214 of the glass substrate 210, and the step of etching the unshielded front surface 212 of the glass substrate 210 includes immersing the glass substrate 210 into etching fluid, such that the etching fluid etches the unshielded front surface 212 without etching the shielded back surface 214, though the application is not limited thereto.

Therefore, the display region 216 and the non-display region 218 on the front surface 212 of the glass substrate 210 are all uneven and hazed. After the front surface 212 of the glass substrate 210 is etched for hazing, the glass substrate 210 can be polished to adjust a hazing degree of the front surface 212, and the shielding of the back surface 214 is removed to recover the light transmissible state thereof, while the front surface 212 is hazed.

Figure 8:
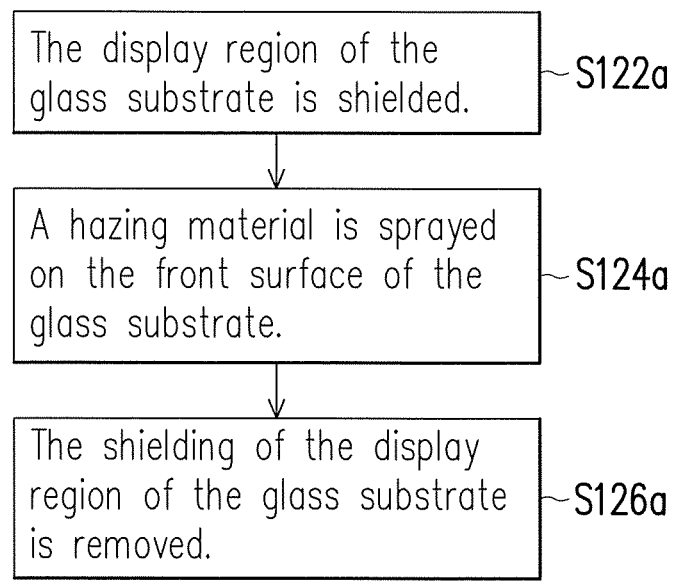
FIG. 8 is a flowchart illustrating a method for hazing a non-display region of a glass substrate according to still another embodiment of the application.

FIG. 8 is a flowchart illustrating a method for hazing a non-display region of a glass substrate according to still another embodiment of the application. Referring to FIG. 1 and FIG. 8, in still another embodiment of the application, the step S120 includes forming a hazed layer 310a (shown in FIG. 9B) on a non-display region 318 of a glass substrate 310, where the hazed layer 310a is not located on a display region 316 of the glass substrate 310. The step of forming the hazed layer 310a on the non-display region 318 of the glass substrate 310 includes following steps. In step S122a, the display region 316 of the glass substrate 310 is shielded. In step S124a, a hazing material is sprayed on the front surface 312 of the glass substrate 310. In step S126a, the shielding of the display region 316 of the glass substrate 310 is removed.

Figure 9A:
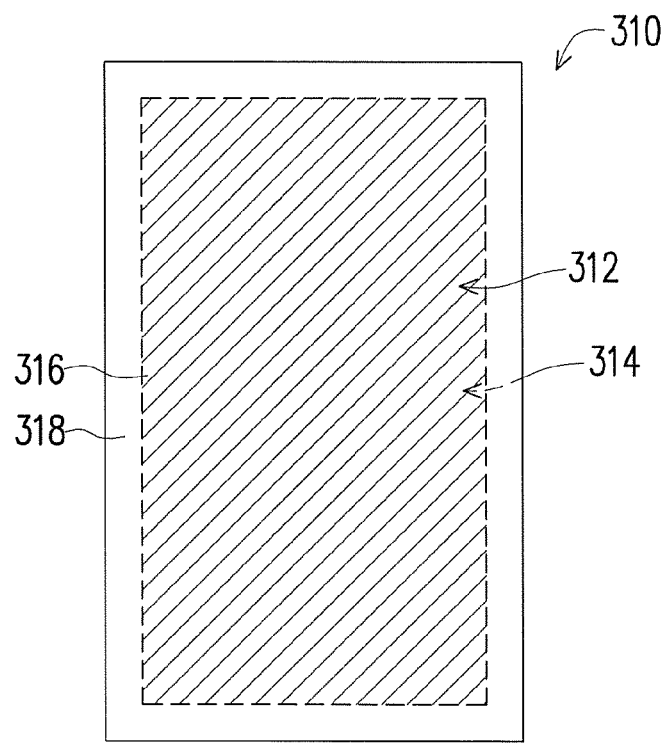
FIGS. 9A-9C are schematic diagrams of a process of hazing the non-display region of the glass substrate of FIG. 8.
Figure 9B:
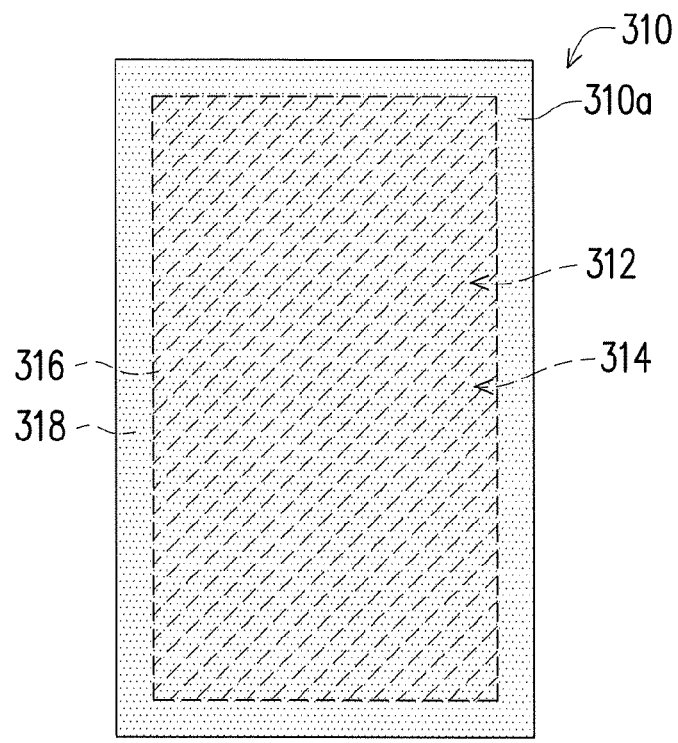
Figure 9C:
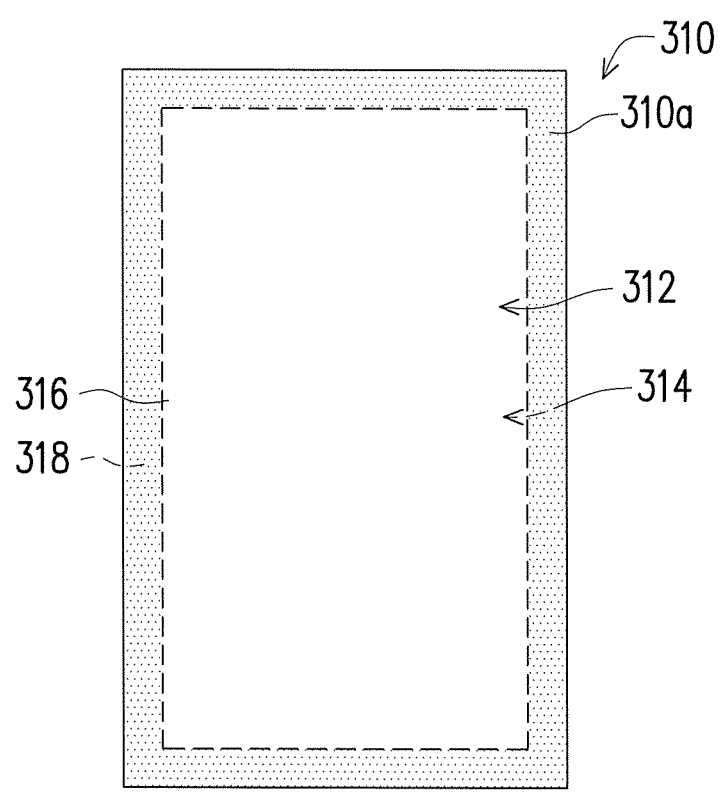

FIGS. 9A-9C are schematic diagrams of a process of hazing the non-display region of the glass substrate of FIG. 8. The process of hazing the non-display region 318 of the glass substrate 310 is described below with reference of FIG. 8 and FIGS. 9A-9C.

Referring to FIG. 8 and FIG. 9A, first, in the step S122a, the display region 316 of the glass substrate 310 is shielded. In the present embodiment, after the step of providing the glass substrate 310 (the step S110), the display region 316 of the glass substrate 310 is shielded, and in the present embodiment, the step S122a includes adhering a shielding film to the display region 316, though the method of shielding the display region 316 of the glass substrate 310 is not limited thereto.

Referring to FIG. 8 and FIG. 9B, in the step S124a, the hazing material is sprayed on the front surface 312 of the glass substrate 310. In the present embodiment, the step S124a includes electroplating the hazing material on the front surface 312 of the glass substrate 310, or printing the hazing material on the front surface 312 of the glass substrate 310, so as to form the hazed layer 310a on the unshielded non-display region 318 of the glass substrate 310. In case that the display region 316 of the glass substrate 310 is shielded, by spraying the hazing material on the front surface 312 of the glass substrate 310, a part of the hazing material is sprayed on the unshielded non-display region 318 to form the hazed layer 310a, and the other part of the hazing material is sprayed on the shielding film and does not form the hazed layer 310a on the display region 316. Moreover, since the hazing material is not sprayed on the back surface 314 of the glass substrate 310, the back surface 314 is not shielded. Therefore, the non-display region 318 of the glass substrate 310 is hazed through the hazed layer 310a.

Referring to FIG. 8 and FIG. 9C, in the step S126a, the shielding of the display region 316 of the glass substrate 310 is removed. In the present embodiment, the step S126a includes removing the shielding film on the display region 316 of the glass substrate 310. After removing the shielding of the display region 316 of the glass substrate 310, the display region 316 is recovered to the light transmissible state, and the non-display region 318 is hazed through the hazed layer 310a. Therefore, in the step of hazing the non-display region 318 of the glass substrate 310 (the step S120), the hazed layer 310a is formed on the non-display region 318 of the glass substrate 310 to haze the non-display region 318 as that shown in FIG. 9C. After the step of hazing the non-display region 318 of the glass substrate 310, the edge of the glass substrate 310 can be trimmed through the aforementioned polishing process and the strength of the glass substrate 310 can be enhanced through the aforementioned chemical hardening process, and then the steps S130 and S140 are performed to complete the glass cover 100.

Figure 10:
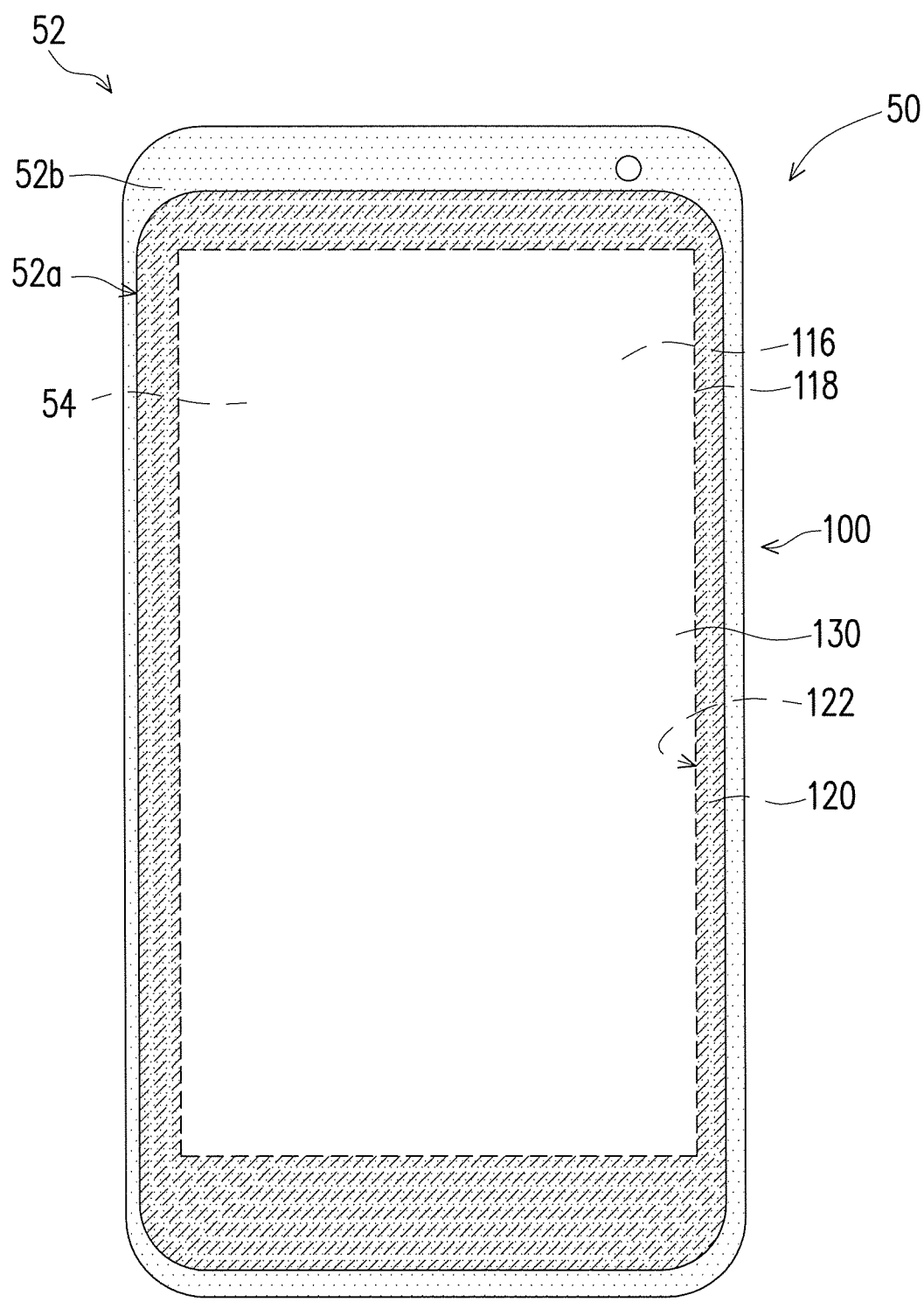
FIG. 10 is a schematic of an electronic device using the glass cover of FIG. 2D.

FIG. 10 is a schematic of an electronic device using the glass cover of FIG. 2D. Referring to FIG. 2D, FIG. 3D, FIG. 5D and FIG. 10, in the present embodiment, after the glass cover 100 is manufactured according to the aforementioned method, the glass cover 100 can be applied in an electronic device 50. The electronic device 50 is, for example, a smart phone, though the type of the electronic device 50 is not limited by the application.

In the present embodiment, an electronic device 50 includes a casing 52, a display panel 54 and the glass cover 100. The casing 52 has an installation opening 52a. The glass cover 100 is disposed at the installation opening 52a. The glass cover 100 includes the glass substrate 110, the patterned decoration layer 120 and the anti-fingerprint layer 130. The glass substrate 110 has the front surface 112 and the back surface 114 opposite to the front surface 112, the front surface 112 has the display region 116 and the non-display region 118 adjacent to the display region 116, and the non-display region 118 is hazed through unevenness, as that shown in FIG. 5D.

In detail, the non-display region 118 is hazed through unevenness based on the aforementioned method, and light transmittance of the non-display region 118 is lower, and a haze and a surface roughness of the non-display region 118 are higher compared with that of the display region 116. Further, when the glass substrate 110 is still not hazed, the light transmittance of the glass substrate 110 is about 93.6% (and values measured through different test equipment are slightly different), the haze is 0.07%, and the surface roughness (a centreline average roughness Ra) is 0.0077 μm.

Therefore, after the non-display region 118 is hazed through unevenness based on the aforementioned method, the display region 116 that is not hazed maintains the light transmittance, the haze and the surface roughness of the original glass substrate 110, and the light transmittance of the hazed non-display region 118 is lower than that of the display region 116, and the haze and the surface roughness of the non-display region 118 are higher than that of the display region 116. In other words, the light transmittance of the hazed non-display region 118 is lower than 93.6%, the haze of the non-display region 118 is higher than 0.07%, and the surface roughness of the non-display region 118 is higher than 0.0077 μm. However, in other embodiments, the haze of the hazed non-display region is higher than 10%, and the surface roughness thereof is higher than 2 μm to achieve a better hazing effect, though the application is not limited thereto.

In the present embodiment, the patterned decoration layer 120 is located on the back surface 114 of the glass substrate 110, and the patterned decoration layer 120 has a light transmissible opening 122, where the light transmissible opening 122 corresponds to the display region 116. The patterned decoration layer 120 is, for example, black ink, though the type and color of the patterned decoration layer 120 are not limited by the application. The anti-fingerprint layer 130 is located on the front surface 112 of the glass substrate 110, as that shown in FIG. 2D and FIG. 3D.

When the glass cover 100 is disposed at the installation opening 52a, the front surface 112 of the glass cover 100 faces to external of the casing 52, and the back surface 114 thereof faces to internal of the casing 52. The display panel 54 is disposed in the casing 52 faces to the back surface 114 of the glass substrate 110, where an optical image generated by the display panel 54 is projected to the external through the light transmissible opening 122 and the display region 116, and the patterned decoration layer 120 shields an internal circuit within the casing 52 to avoid the user viewing the internal circuit within the casing 52 through the light transmissible glass cover 100 from the external of the casing 52.

Moreover, the non-display region 118 of the glass substrate 110 of the glass cover 100 is hazed through unevenness. Therefore, when the user touches the glass cover 100 through a finger to operate the electronic device 50, the user can distinguish the display region 116 and the non-display region 118 through senses of sight and touch, and the anti-fingerprint layer 130 can prevent fingerprints of the user or dirt from remaining on the glass substrate 110. Therefore, the electronic device 50 has a better operation mode. Moreover, a region of an appearance surface 52b of the casing 52 adjacent to the non-display region 118 is hazed, such that the electronic device 50 has a better decoration.

In summary, in the method for manufacturing the glass cover of the application, by hazing the non-display region of the glass substrate of the glass cover, the glass cover has a hazed appearance. Moreover, since the non-display region of the glass substrate is hazed, the display region and the non-display region of the glass substrate have different sight and touching effects, such that the user can distinguish the display region and the non-display region through senses of sight and touch. Therefore, the glass cover and the electronic device applying the glass cover have the hazed appearance and have better operation mode.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A glass cover, adapted to be disposed at an installation opening of a casing of an electronic device, the glass cover comprising:

a glass substrate, having a front surface and a back surface opposite to the front surface, wherein the front surface has a display region and a non-display region adjacent to the display region, the display region has a top side and a bottom side opposite to each other, the non-display region has a first zone aligned with the top side, the casing has a second zone aligned and coplanar with the first zone, the non-display region has a third zone aligned with the bottom side, the casing has a fourth zone aligned and coplanar with the third zone, an area of the first zone is smaller than an area of the second zone while the area of the first zone is larger than an area of the fourth zone, the non-display region is hazed such that a continuous hazed appearance surface at a front side of the electronic device is formed with the first zone and the second zone being hazed, and a display panel of the electronic device is disposed corresponding to the display region.

2. The glass cover as claimed in claim 1, wherein the non-display region is hazed through unevenness, such that a light transmittance of the non-display region is lower compared to that of the display region, and a haze and a surface roughness of the non-display region are higher compared to that of the display region.

3. The glass cover as claimed in claim 1, wherein the non-display region is hazed through unevenness, and a haze of the non-display region is higher than 0.07%.

4. The glass cover as claimed in claim 1, wherein the non-display region is hazed through unevenness, and a haze of the non-display region is higher than 10%.

5. The glass cover as claimed in claim 1, wherein the non-display region is hazed through unevenness, and a surface roughness (a centreline average roughness Ra) of the non-display region is higher than 0.0077 μm.

6. The glass cover as claimed in claim 1, wherein the non-display region is hazed through unevenness, and a surface roughness (a centreline average roughness Ra) of the non-display region is higher than 2 μm.

7. An electronic device, comprising:
a casing, having an installation opening;
a glass cover, disposed at the installation opening, and comprising:
a glass substrate, having a front surface and a back surface opposite to the front surface, wherein the front surface has a display region and a non-display region adjacent to the display region, the display region has a top side and a bottom side opposite to each other, the non-display region has a first zone aligned with the top side, the casing has a second zone aligned and coplanar with the first zone, the non-display region has a third zone aligned with the bottom side, the casing has a fourth zone aligned and coplanar with the third zone, an area of the first zone is smaller than an area of the second zone while the area of the first zone is larger than an area of the fourth zone, and the non-display region is hazed such that a continuous hazed appearance surface at a front side of the electronic device is formed with the first zone and the second zone being hazed; and
a display panel, disposed corresponding to the display region in the casing, wherein an optical image generated by the display panel is projected to external through the display region.

8. The electronic device as claimed in claim 7, wherein the non-display region is hazed through unevenness, such that a light transmittance of the non-display region is lower compared to that of the display region, and a haze and a surface roughness of the non-display region are higher compared to that of the display region.

9. The electronic device as claimed in claim 7, wherein the non-display region is hazed through unevenness, and a haze of the non-display region is higher than 0.07%.

10. The electronic device as claimed in claim 7, wherein the non-display region is hazed through unevenness, and a haze of the non-display region is higher than 10%.

11. The electronic device as claimed in claim 7, wherein the non-display region is hazed through unevenness, and a surface roughness (a centreline average roughness Ra) of the non-display region is higher than 0.0077 μm.

12. The electronic device as claimed in claim 7, wherein the non-display region is hazed through unevenness, and a surface roughness (a centreline average roughness Ra) of the non-display region is higher than 2 μm.

13. The glass cover as claimed in claim 1, further comprising:
an anti-fingerprint layer, located on the front surface of the glass substrate.

14. The electronic device as claimed in claim 7, wherein the glass cover further comprises an anti-fingerprint layer, located on the front surface of the glass substrate.

15. The glass cover as claimed in claim 1, further comprising:
a patterned decoration layer, located on the back surface of the glass substrate, wherein the patterned decoration layer has a light transmissible opening, and the light transmissible opening corresponds to the display region.

16. The electronic device as claimed in claim 7, wherein the glass cover further comprises:
a patterned decoration layer, located on the back surface of the glass substrate, wherein the patterned decoration layer has a light transmissible opening, and the light transmissible opening corresponds to the display region.

* * * * *